No. 852,086. PATENTED APR. 30, 1907.
W. B. TUNNELL.
PLOW ATTACHMENT.
APPLICATION FILED APR. 22, 1904.
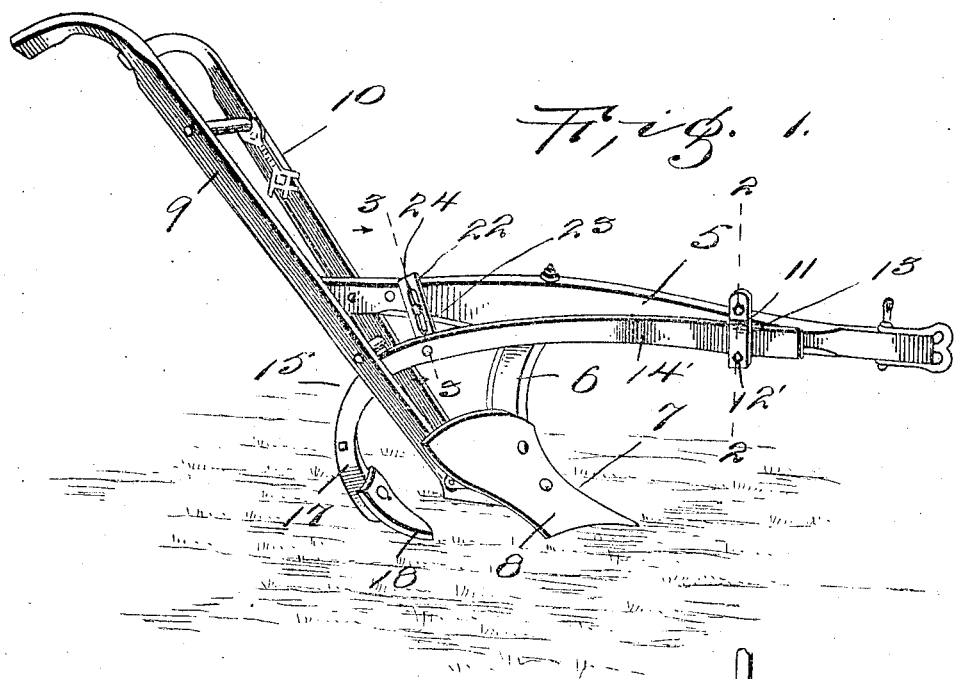
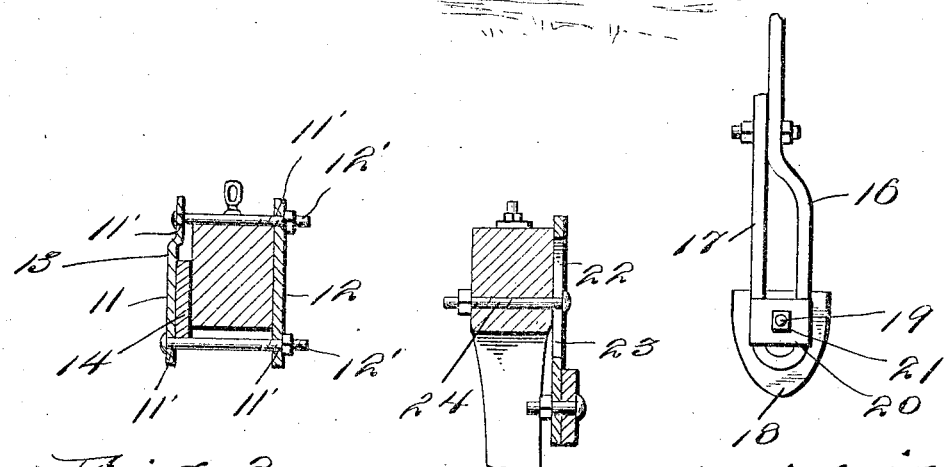

UNITED STATES PATENT OFFICE.

WILSON B. TUNNELL, OF VAN, TEXAS.

PLOW ATTACHMENT.

No. 852,086.  Specification of Letters Patent.  Patented April 30, 1907.

Application filed April 22, 1904. Serial No. 204,443.

*To all whom it may concern:*

Be it known that I, WILSON B. TUNNELL, a citizen of the United States, residing at Van, in the county of Van Zandt, State of Texas, have invented certain new and useful Improvements in Plow Attachments; and I do hereby declare the following to be a full, clear, and exact description of the invention, such as will enable others skilled in the art to which it appertains to make and use the same.

This invention relates plows and more particularly to attachments therefor and has for its object to provide an attachment with which any plow may be equipped and which will turn the subsoil as the plow proper opens the furrow thus saving additional expense and labor in treating the subsoil after the plowing operation has been completed.

A further object is to provide an attachment which may be adjusted to plow the subsoil at any desired depth, within certain limits.

In the drawings forming a portion of this specification and in which like numerals of reference indicate similar parts in the several views, Figure 1 is a side elevation of a plow provided with the present invention. Fig. 2 is a section on line 2—2 of Fig. 1. Fig. 3 is a section on line 3—3 of Fig. 1. Fig. 4 is a rear elevation of the sub-soil shovel and a portion of the plate or standard by which it is carried.

Referring now to the drawings, there is shown a plow comprising the usual beam 5, standard 6, share 7, mold-board 8, and handles 9 and 10.

Secured at opposite sides of the beam 5 adjacent to the forward end thereof are plates 11 and 12 which are held in position by means of a pair of bolts 12' which are engaged with perforations 11' in the plates and which lie above and below the beam. The plate 11 has an offset portion 13 therein with which is engaged a supplemental beam 14 which extends rearwardly between the handles 9 and 10 where it is turned downwardly, as shown at 15, and lies with its lower extremity in the rear of the share and moldboard. The free end of the supplemental beam is turned laterally and upwardly parallel to itself to form spaced portions 16 and 17, the upper end of the portion 16 being turned to lie against the portion 17 and is welded or otherwise secured thereto.

A soil treating blade 18 is secured to the forward faces of the portions 16 and 17 by means of a bolt 19 passed therebetween which has a washer 20 and bolt 21 upon its free end. It will thus be apparent that the bolt may be loosened to permit of adjustment of the blade longitudinally of the portions 16 and 17 and that it may be tightened to hold the blade in the desired position.

The offset portion 13 is sufficiently large to permit of considerable movement of the supplemental beam 14 therein so that the lower end of this beam and the blade 18 may be shifted vertically, and to hold the plate at any desired point in its path of movement a slotted plate 22 projects upwardly therefrom and has its slot 23 engaged with a clamping bolt 24 which is passed through a perforation in the beam 5. It will thus be seen that the clamping bolt may be loosened and the plate 14 adjusted to plow the soil to the desired depth after the bolt 24 may be tightened to prevent further movement of the plate. If slight further adjustment is desired, it may be accomplished by moving the blade 18 upon the portions 16 and 17 as described above.

The supplemental beam 14 has an outward bend 14' therein to bring its lower end into the correct position with respect to the share and mold board.

In practice, modifications of the specific construction shown may be made and any suitable materials and proportions may be used for the various parts without departing from the spirit of the invention.

What is claimed is:—

The combination with a plow including a beam, of the supplemental beam 14 detachably and adjustably connected with the plow beam and offset adjacent its forward end to cause the same to extend at an angle to the beam of the plow, the rear end portion of the beam 14 being bent downwardly and forwardly as at 15 and provided adjacent its lower end with the single offset portion 16, the beam being bent upon itself below the offset portion 16 and having its extreme end portion arranged to bear against the inner face of the down-turned portion 15 of the beam at a point directly above the offset portion 16 thereof, the said extreme end portion of the beam being bolted in this position, and the soil-treating blade 18 secured to the beam by means of the bolt 19 which is engaged between the members 16 and 17, substantially as described and for the purpose stated.

In testimony whereof, I affix my signature, in presence of two witnesses.

WILSON B. TUNNELL.

Witnesses:
J. M. STONE,
W. L. GARLAND.